United States Patent [19]

Inukai

[11] Patent Number: 5,111,848
[45] Date of Patent: May 12, 1992

[54] APPARATUS FOR PREVENTING PULSATIONS IN A FLOWING FLUID

[75] Inventor: Yuzo Inukai, Shizuoka, Japan

[73] Assignee: Fuji Photo Film Co., Ltd., Kanagawa, Japan

[21] Appl. No.: 684,514

[22] Filed: Apr. 15, 1991

Related U.S. Application Data

[63] Continuation of Ser. No. 169,682, Mar. 18, 1988, abandoned.

[30] Foreign Application Priority Data

Mar. 19, 1987 [JP] Japan ............... 62-62677

[51] Int. Cl.⁵ .................................... F16L 55/04
[52] U.S. Cl. ................................. 138/30; 137/1
[58] Field of Search .......... 138/26, 30; 220/85 B; 137/1, 568; 267/118, 113, 122, 141.1

[56] References Cited

U.S. PATENT DOCUMENTS

| 852,150 | 4/1907 | Whitney | 138/30 |
|---|---|---|---|
| 1,824,342 | 9/1931 | Gillen et al. | 138/30 |
| 2,261,948 | 11/1941 | Beach | 138/30 |
| 2,642,091 | 6/1953 | Morin | 267/118 |
| 2,735,642 | 2/1956 | Norman | 138/30 |
| 2,828,771 | 4/1958 | Poore | 138/30 |
| 2,875,786 | 3/1959 | Shelly | 138/30 |
| 2,896,667 | 7/1959 | Jumba | 138/30 |
| 3,326,898 | 4/1968 | Hugley | 138/30 |
| 3,556,159 | 1/1971 | Bleasdale | 138/30 |
| 3,601,128 | 8/1971 | Hakim | 138/30 |
| 3,621,882 | 11/1971 | Kupiec | 138/30 |
| 3,766,992 | 10/1973 | Tiraspolsky et al. | 138/30 |
| 4,523,612 | 6/1985 | Kuklo | 138/30 |
| 4,651,781 | 3/1987 | Kandelman | 138/30 |
| 4,759,387 | 7/1988 | Arendt | 138/30 |
| 4,928,719 | 5/1990 | Inukai | 138/30 |

FOREIGN PATENT DOCUMENTS

| 642989 | 3/1937 | Fed. Rep. of Germany | 138/30 |
|---|---|---|---|
| 56-160497 | 12/1981 | Japan | |
| 58-217890 | 12/1983 | Japan | |
| 59-73692 | 5/1984 | Japan | |
| 383541 | 11/1932 | United Kingdom | 138/30 |

Primary Examiner—James E. Bryant, III
Attorney, Agent, or Firm—Sughrue, Mion, Zinn Macpeak & Seas

[57] ABSTRACT

Pulsations in a pressurized fluid flowing through a conduit pipe is prevented by changing the inner volume of the pipe by changing the cross-sectional area of a flexible pipe portion in dependence upon the pressure of the flowing fluid without changing the peripheral length of the cross-section of the pipe portion thereby absorbing any pressure changes.

For this purpose the apparatus comprises a tube or a hollow substantially spherical body having flexibility in at least one cross-section thereof, and a member operating as an elastic body for resiliently regulating the cross-sectional area of the inner bore of the tube or the substantially spherical body to a cross-sectional area less than the maximum cross-sectional area thereof.

14 Claims, 6 Drawing Sheets

FIG. 1-a
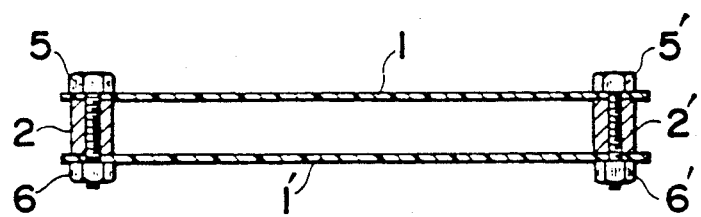
FIG. 1-b
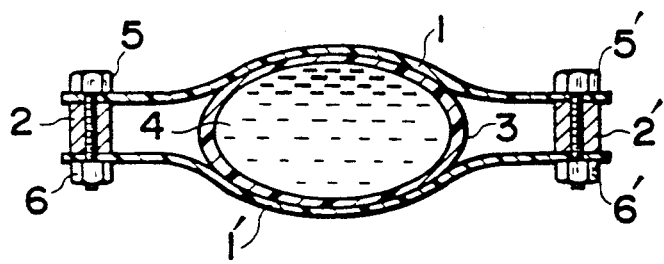
FIG. 1-c
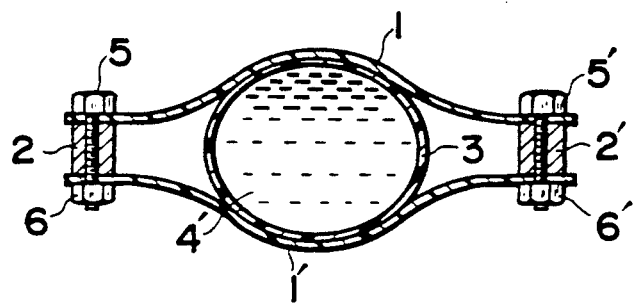

FIG. 1-d
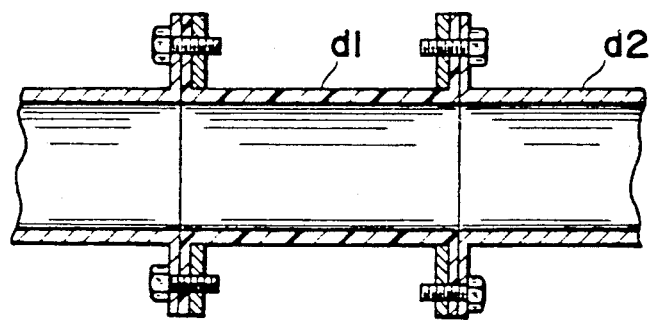
FIG. 1-e
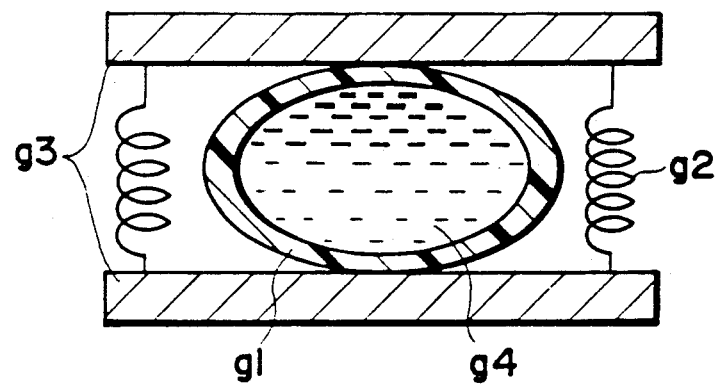

APPARATUS FOR PREVENTING PULSATIONS IN A FLOWING FLUID

This is a continuation of application Ser. No. 07/169,682 filed Mar. 18, 1988, now abandoned.

BACKGROUND

This invention relates to a method and an apparatus for preventing pulsations in a fluid being transported to flow from a sending or flowing-out section under pressure to a point of destination through a piping system. More particularly, it relates to a method and an apparatus for preventing pulsations in a flowing fluid when the latter is transported under pressure by a diaphragm pump, plunger pump or a gear pump liable to produce pulsations in the flowing fluid.

In general, when transporting liquids or gases such as solvents, paints or photosensitive coating liquids under pressure to another device or equipment through a piping system, pumps liable to produce pulsations, such as diaphragm pumps, plunger pumps or gear pumps, are frequently employed.

However, in case vigorous pulsations occur in the flowing fluid being forcibly caused to flow under pressure, the fluid is transported and supplied only intermittently, so that it becomes difficult to transport and supply the fluid at a constant flow rate. In addition, the pumps may be subjected to an overload due to pressure fluctuations caused by pulsations, resulting frequently in the troubles caused to the pumps.

Also, when transporting a photosensitive coating liquid to a coating apparatus for coating, uniform coating cannot be obtained in case pulsations occur in the photosensitive coating liquid during transport thereof under pressure, so that the coated products cannot be used effectively as the photosensitive material. In addition, in the case of the coating process employing paints or the like coating compositions, the latter may be discharged unevenly or interruptedly, so that it is extremely difficult to achieve uniform coating.

Therefore, when transporting the liquid under pressure through a piping system by a pump, it is necessary to reduce the liquid pulsations to as small a value as possible.

For preventing or reducing the aforementioned pulsations caused during liquid transport under an elevated pressure, a typical conventional practice has been to provide a hermetically closed hollow chamber in communication with a portion of a conduit pipe extending from a pumping section, such as a pump, to a point of destination, in such a manner that the pulsations caused during the transport flow under an elevated pressure will be absorbed by compression and expansion of the air occurring in the hollow chamber. The internal space of the hollow chamber is hermetically sealed from the ambient atmosphere provided that it is kept in communication with the conduit pipe, with the air pressure therein having been equal to the atmospheric pressure prior to starting of the liquid transport under the elevated pressure. Since the liquid intrudes under pressure into the hollow chamber during the transport flow, the air pressure in the hollow chamber is raised to a value higher than the atmospheric pressure.

The Japanese Patent Kokai Publications Nos. 56(1981)-160497 and 58(1983)-217890 and the Japanese Utility Model Kokai Publication No. 59(1984)-73692 are directed to the methods and apparatus pertinent to the present invention.

DISCUSSION OF THE PROBLEMS IN THE PRIOR ART

However, these known conventional methods for preventing pulsations suffer from a number of drawbacks.

In the above described method in which the hermetically sealed hollow chamber is kept in communication with a conduit pipe, the extent of the liquid pulsations caused during the transport flow extensively differs depending on such factors as the pump type, the discharge pressure and volume, the fluid characteristics of the liquid transported under pressure, the material and the inside diameter of the conduit pipes.

On the other hand, the size of the hollow chamber for preventing the liquid pulsations which should be kept in communication will the conduit pipe need be determined as a function of the extent of the fluid fluctuations, in such a manner that the larger is the extent of the fluid fluctuations, the larger should be the volumetric capacity of the chamber. Thus the size of the hollow chamber must be determined on the basis of the aforementioned conditions, so that a number of such chambers with various volumetric capacities are required with increased costs in production and labor.

Also, when a liquid that is expensive or liable to changes with the lapse of time, such as the photosensitive coating liquid, is subject to considerable pulsations during transport thereof, it is necessary to use a hollow chamber of a large volumetric capacity to prevent such pulsations when the pulsations are large. The result is that a large quantity of the liquid flows into the chamber. The liquid flowing in a large quantity into the chamber after termination of the transport under the elevated pressure has to be drained to waste with considerable economical demerits.

The Japanese Patent Kokai Publication No. 56-160497 shows a process for eliminating the aforementioned drawbacks according to which a liquid is transported under pressure after the air pressure within the hollow chamber has been elevated previously to a pressure higher than the atmospheric pressure.

However, this process also has a disadvantage that, when transporting under pressure a deaerated liquid, that is, a liquid from which dissolved gases, such as air, have been removed in advance, such deaerated liquid will absorb air within the hollow chamber when the transport under the elevated pressure is performed for an extended period of time, with the result that not only the effect of deaeration is lowered but also the flow of the liquid into the hollow chamber is increased.

The process for preventing pulsations with the use of the hollow chamber also has a disadvantage that a lot of time and labor are involved in a washing step when the liquid having been transported under pressure is to be exchanged to another liquid.

The Japanese Patent Kokai Publication No. 58-217890 and the Japanese Utility Model Kokai Publication No. 59-73692 disclose a process for preventing pulsations by a radially expandable and retractable elastic tube, in order to replace the above-described process for preventing pulsations employing the hollow chamber.

These known processes for preventing pulsations by the elastic tubes suffer from a drawback that, when employing a photosensitive coating liquid containing an organic solvent or an aqueous photosensitive coating liquid containing an organic solvent, the elastic tubes tend to become swollen or dissolved in the organic solvent, so that the properties thereof in effectively preventing the pulsations may be eventually lost.

Thus the demand has been placed on the elastic tubes that may be safely used with organic solvents. However, at present, there lacks an inexpensive tube that may be used safely with any organic solvents for preventing pulsations. Although elastic tubes made of a material capable of being used safely with certain kinds of the organic solvents, these tubes may be costly, so that they can be used only with considerable economic demerits.

SUMMARY OF THE DISCLOSURE

It is an object of the present invention to provide a method and an apparatus for preventing pulsations which is devoid of the aforementioned drawbacks in the prior art.

In view of the above object, according to a first aspect of the present invention there is provided a method for preventing pulsations in a fluid flowing under pressure through a conduit pipe system, wherein the inner volumetric capacity of said conduit pipe system is changed by changing the cross-sectional area of said conduit pipe system in dependence upon the pressure of the flowing fluid without changing the peripheral length of said cross-section of said conduit pipe system thereby absorbing any pressure changes caused during the time said fluid flows under pressure.

According to a second aspect of the present invention there is also provided an apparatus for preventing pulsations in a flowing fluid comprising a tube or a hollow substantially spherical body having flexibility in at least one cross-section thereof, and a member serving as an elastic body for resiliently regulating the cross-sectional area of the bore of said tube or said substantially spherical body to a cross-sectional area less than its maximum cross-sectional area.

As described above, the present method and apparatus for preventing fluid pulsations make it possible to reduce pulsations generated by the pump significantly despite its simplified structure.

Therefore, it becomes possible to cause the fluid to flow at a constant rate and to prevent pulsations especially caused in pumping organic solvents to flow under pressure. In addition, when the photosensitive coating liquid dissolved in an organic solvent or containing the organic solvent is to be coated by a coating apparatus, a uniform photosensitive film may be produced and, when using a paint containing an organic solvent, a uniform coating surface may be produced.

When compared to a device employing the hollow chamber, the present apparatus is simplified in structure while it has many economical advantages with respect to reduction in costs and labor, reduction in liquid losses and improved pumping and flushing performance. Moreover, it is more excellent than the manner employing circumferentially expandable and contractible elastic tubes with respect to reduced production costs and improved adaptability to the various types of liquids.

PREFERRED EMBODIMENTS

The method for preventing fluid pulsations according to the present invention is characterized in that the inner volumetric capacity of the conduit pipe is changed by changing the cross-sectional area of said conduit pipe in dependence upon the pressure of the pressurized flowing fluid without changing the peripheral length of the cross-sectional area of the conduit pipe to absorb any pressure changes caused during the pressurized fluid flow.

For the pressurized flow of the fluid for transportation through the conduit pipe, it suffices that the pressure be applied to at least a portion of the liquid in the conduit pipe to transport the fluid.

The method for preventing fluid fluctuations according to the present invention resides in increasing or decreasing the inner volumetric capacity of the conduit pipe to minimize changes in the pressure applied by the liquid to the inner wall of the conduit pipe.

Such changes in the inner capacity of the conduit pipe may occur at a portion or over the entire extent of the conduit pipe.

For changing the inner volumetric capacity of the conduit pipe, the cross-sectional area of the conduit pipe is changed in dependence upon the pressure in the flowing fluid and without changing the peripheral length of the cross-sectional area of the conduit pipe.

By the principle "the cross-sectional area of the conduit pipe is changed in dependence upon the pressure in the flowing fluid and without changing the peripheral length of the cross-sectional area of the conduit pipe" it is meant that, for example, a certain co-relation is maintained between the pressure applied by the flowing fluid to the inner wall of the conduit pipe and the cross-sectional area of the conduit pipe such that the cross-sectional area is increased or decreased by changing the cross-sectional shape without expanding or contracting the material of the conduit pipe so that the peripheral length of the cross-section will remain constant. This may be realized in various manners to satisfy this requirement. For example, a member having flexibility (or resiliency) in at least at one cross-section may be used and the cross-sectional area of the inner bore of the conduit pipe may be regulated to a cross-sectional area less than its maximum cross-sectional area through resiliency of the material of the member by applying an elastic reaction force thereto. Alternatively, the cross-sectional area of the conduit pipe may be controlled on the basis of a pressure obtained by a pressure sensor provided in the conduit pipe.

For changing the inner volumetric capacity of the conduit pipe, the cross-sectional area may be changed depending on the pressure in the flowing fluid (or liquid) and without changing the peripheral length of the cross-section in at least one cross-section of the conduit pipe.

It is only sufficient that the tube or the substantially spherical hollow body having flexibility according to the present invention be changed in its cross-sectional area with the peripheral length of the cross-section thereof being unchanged. There is no limitation on the shape defined by the inner wall of the tube when the inner volumetric capacity of the tube becomes maximum, and thus it may for example be a circular or elliptical column or a sphere or other shapes, or a combination thereof.

Although there is no limitation on the cross-section of a shape defined by the inner wall of the tube when the inner volumetric capacity of the flexible tube becomes maximum, it is preferred that the shape be circular or elliptical.

There is no limitation on the inside or outside diameter of the bore of the tube or the hollow body in the form of a sphere having flexibility as described above, and it may be the same as or larger or smaller than the diameter of the conduit pipe.

There is no limitation on the diameter of the bore of the portion of the flexible tube or body connected to the conduit pipe, such that the diameter may be preferably equal to or smaller than the diameter of the conduit pipe for better purging and flushing ability. One such bore may be provided on the tube or the hollow body having flexibility so as to be used as the common fluid inlet and outlet, or two such bores may be provided to the tube or body so as to be used as the separate fluid inlet or outlet.

The cross-sectional area of the bore defined within a wall of the flexible tube or body may be regulated to a constant value less than the maximum cross-sectional area, either directly by the member acting as an elastic body, or indirectly through a rigid body interposed between the tube and an elastic body.

The member acting as the elastic body in the apparatus for preventing pulsations according to the present invention may be enumerated not only by springs such as coil-, spiral-, leaf- or volute springs and well-known elastic materials such as natural rubbers, various synthetic rubbers or synthetic resins, but also fluid such as gases or liquids enclosed in or otherwise controlled in shape by a flexible or extendable membrane or vessel, with or without an interposed rigid member.

Basically, the tube or the substantially spherical hollow body used in the present apparatus for preventing fluid pulsations (hereafter referred to only as "flexible tube") need be flexible only in the radial direction without being elongated or contracted in the circumferential and lengthwise directions. When employing the organic solvent or the photosensitive coating liquid dissolved in or containing the organic solvent, the flexible tube may be produced by a less costly material, such as polyethylene, which is resistant to the chemicals, polyfluoroethylene, which is stable to almost all organic solvents or the like.

A hose pipe formed of polyfluoroethylene experiences only limited expansion and contraction as compared to the elastic tube, (although it depends on its wall thickness), such that it has only limited ability to absorb pulsations by extension and contraction thereof in the circumferential and lengthwise directions.

However, the mechanism of preventing pulsations by an elastic tube basically resides in absorbing changes in the discharge volume periodically produced by a pump by the increase or decrease in the inner volumetric capacity of the tube by taking advantage of the elongation and contraction of the elastic tube especially in the circumferential direction. Thus it may be considered as the periodic changes in the volumetric capacity of the elastic tube.

Therefore, the inventive method for preventing pulsations in the pressurized flowing liquid by the pump may resort to the function of the volumetric changes in the capacity of the hose depending upon the liquid pressure and thus without resorting to the expansion and contraction of the elastic tube.

Thus it is possible to adopt a method in which the radial cross-sectional shape of a hose which is usually circular or nearly circular is previously changed from its maximum value to a shape which is elliptical or nearly elliptical and in which the radial cross-sectional shape is circular or nearly circular immediately after the pulsations have been absorbed with concomitant increase in the cross-sectional area.

The function of preventing pulsations may be afforded by taking advantage of these changes so that the volumetric capacity may be increased or decreased without changing the overall length or peripheral length of the hose.

According to the above described principle of the present method, the hose used for increasing or decreasing the volumetric capacity need only be flexible in at least at one cross-section thereof, so that it is not limited to the above shapes.

It is to be noted that a composite flexible hose formed by a portion contacting with the organic solvent formed of a material resistant to chemicals, such as polyfluoroethylene (0.5 to 2.9 mm thick) and by a rubber lining, may also be used for improving pressure resistance of the flexible tube or affording resiliency to the tube so as to follow up with the frequency of the pulsations. A flexible composite tube formed of an expandable and contractable material, such as rubber, and controlled in the expandability thereof by the inexpandable yarn or wire (in meshed or coiled fashion) which can endure a high pressure, may also be used in the present invention.

BRIEF DESCRIPTION OF THE DRAWINGS

FIG. 1-a is a sectional view of an embodiment of a member acting as an elastic member in the apparatus for preventing pulsations according to the present invention.

FIG. 1-b is a sectional view showing an embodiment of the apparatus of the present invention when the bore of the tube having flexibility in at least one cross-section thereof is regulated to a cross-sectional area less than its maximum cross-sectional area.

FIG. 1-c is a sectional view similar to FIG. 2 and showing a state when the tube having flexibility has absorbed the pulsations.

FIG. 1-d illustrates a typical case of mounting a flexible tube or a substantially spherical hollow flexible tube of the present apparatus to a conduit pipe.

FIG. 1-e shows a typical example of a member acting as an elastic body used in the present apparatus for resiliently regulating the flexible tube having flexibility in at least one cross-section thereof by applying an elastic reaction force.

DETAILED DESCRIPTION OF THE PREFERRED EMBODIMENTS

Figure 2:
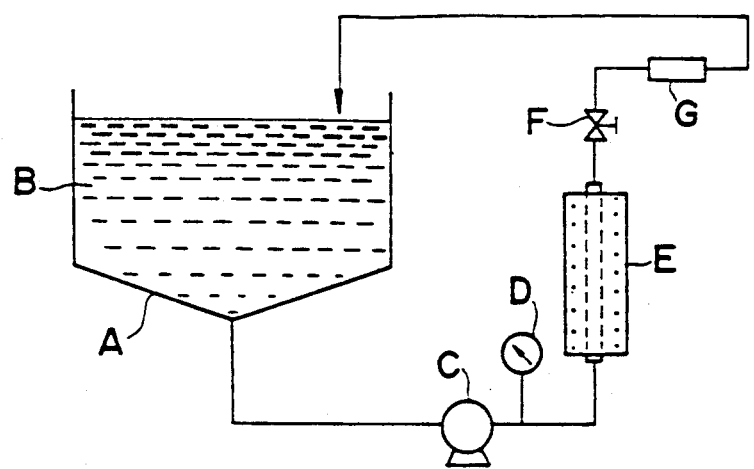
FIG. 2 is a diagrammatic view showing a test system for ascertaining the effect of the method and the apparatus according to the present invention.

The method and the apparatus for preventing pulsations according to the present invention will be explained hereafter in more detail. Although the present invention will be explained by referring to FIGS. 1-a, 1-b and 1-c with reference to the case in which a flexible tube such as a hose is repeatedly changed in its radial cross-sectional shape between the ellipsis and circle, or a shape similar thereto, it is to be understood that the present invention is not limited to such shape or method.

According to the present invention, the radial cross-sectional area of a resilient tube, such as a hose, is previously reduced to a value less than its maximum area and, after a liquid pulsation has been absorbed by a corresponding increase in such cross-sectional area, the tube is again restored to its original cross-sectional area. To this end, a pair of elastic (or resilient) bodies 1, 1', such as sheet springs, are secured in a spaced apart relation to each other by spacers 2, 2', bolts 5, 5' and nuts 6, 6'. The flexible tube 3 is then installed in an intermediate position between the elastic bodies 1 and 1'.

The liquids 4, 4' are discharged under pressure by a pump liable to produce pulsations, such as a diaphragm pump, plunger pump, or gear pump, so as to be supplied under pressure through the resilient pipe 3. When a back pressure is applied to the liquid by means of a valve, (not shown in the Figure), after passage of the liquids through the resilient pipe 3, the liquids 4, 4' undergo pulsation and the resultant increase in pressure, which increase in pressure can be absorbed by the corresponding volumetric change due to increase of the cross-section in the resilient tube 3, as shown in FIG. 1-c.

The tube 3 which has absorbed the pressure increase due to such pulsation and thus increased in volume, is subjected at the next moment to a reaction force applied from the elastic bodies 1, 1' which will act to reduce its volume so that the tube 3 is restored to the state preceding the increase in volume, as shown in FIG. 1-b.

By the repetition of alternate increase and decrease in volume of the tube, it is possible to prevent pulsations in the liquid discharged by a pump.

As described above, the apparatus of the present invention for preventing the pulsations in the liquid flow is so designed that the rise in the liquid pressure caused during the liquid discharge due to pulsation may be absorbed by the corresponding increase in the volume of the tube having resiliency in at least one cross-section thereof. Thus the factors contributing to the prevention of pulsations may include, for example, the pressure applied to the liquid flowing through the aforementioned resilient tube, the shape and the material of the member acting as the elastic body, the type and the discharge volume of the pump, etc. These factors may be suitably selected depending upon fluid characteristics of the liquids, the material and the shape of the conduit pipes and the type of pulsations to be absorbed.

For example, when the member acting as the elastic body has higher elasticity and the liquid flowing through a tube having resiliency in at least one cross-section thereof is subject to only a lower pressure, the effect of the tube in preventing pulsations is low because the resilient tube is subject to only a smaller increase in volume. The effect of the tube in preventing pulsations is similarly low when the tube is subject to an excessively high pressure. The effect of the tube in preventing pulsations is likewise low when the member acting as the elastic body has only low elasticity and the liquid flowing through the tube having resiliency is subject to an elevated pressure.

This means that there is a pressure range for effectively preventing pulsations for the specific shape and the material etc. of the member acting as the elastic body.

There is a pressure range for effectively preventing pulsations also in the case where a combination of a rigid body and a coil spring having elasticity is used as the member acting as the elastic body, since the above described resilient tube may be increased or decreased in pressure with the use of this type of the member.

FIG. 2 shows a test system for ascertaining the above effect highly schematically. In FIG. 2, A denotes a liquid storage tank, B a liquid, C a pump, D a pressure gauge, E an apparatus for preventing pulsations as shown in FIGS. 1-a, 1-b and 1-c and including the flexible tube 3, elastic bodies 1, 1' and other members including those not shown, F a valve for application of a back pressure to the flexible tube in the apparatus E, and G a flow meter for measuring the pulsations.

The liquid B is sucked by the pump C from the liquid storage tank A so as to be supplied to the apparatus E. The valve F is provided downstream of the apparatus E for pressurizing the liquid contained in the flexible tube 3 of the apparatus E. The valve F may be adjusted for setting the pressure by the pressure gauge D. The flow meter G is provided downstream of the valve F for measuring the pulsations of the liquid which has passed through the valve F. The liquid which has passed through these components is returned to the liquid storage tank A.

The above described test system is used for evaluating the ability of the present apparatus in preventing pulsations.

The description with reference to several test examples is given hereinbelow. It should be noted that the scope of the present invention is by no means limited to these specific examples.

EXAMPLE

EXAMPLE 1

Using the test system shown in FIG. 2, pulsations occurring in a photosensitive coating liquid having a composition and properties shown in Table 1 were measured. The following are the details of the apparatus for preventing pulsations, elastic bodies and the pump employed in the present test example.

| i. apparatus for preventing pulsations | |
|---|---|
| i) flexible tube | |
| a) inside diameter | 35 mm |
| b) length | 700 mm |
| c) shape | composite hose (inside) polyfluoroethylene wall thickness, 1.5 mm (outside) EPT (ethylenepropyleneterpolymer) rubber (rubber hardness 70) wall thickness, 5 mm |
| ii) elastic body | |
| a) material | transparent PVC polyvinylchloride (PVC) plate |
| b) size | 600 mm length, 350 mm width and 2 mm thickness |
| c) spacer height | 10 mm |
| d) spacer-to-spacer interval | 200 mm |
| ii. pump | |
| i) type | non-pulsating, tandem type plunger pump |
| ii) number of rotations of driving motor | 1420 r.p.m. at the maximum |
| iii) discharge | 4.3 l/min. at the maximum |

TABLE 1

| Photosensitive Coating Liquid | | |
|---|---|---|
| Composition | Esterified compound of naphthoquinone-(1,2) diazido-(2)-5-sulfonic acid | 0.7 parts by weight |

TABLE 1-continued

| | Photosensitive Coating Liquid | | |
|---|---|---|---|
| | chloride and poly-p-hydroxyethylene | | |
| | Novolak-type Phenolic Resins | 2.0 | " |
| | Methylethylketone | 15.0 | " |
| | Methylcellosolveacetate | 25.0 | " |
| | Fluorine Containing Surfactant | 0.2 | " |
| Physical | Viscosity | 1.8 | cp (measured at 20° C.) |
| Properties | Specific Gravity | 0.902 | (measured at 20° C.) |
| | Surface Tension | 24 | dyne/cm (measured at 20° C.) |

Figure 3:
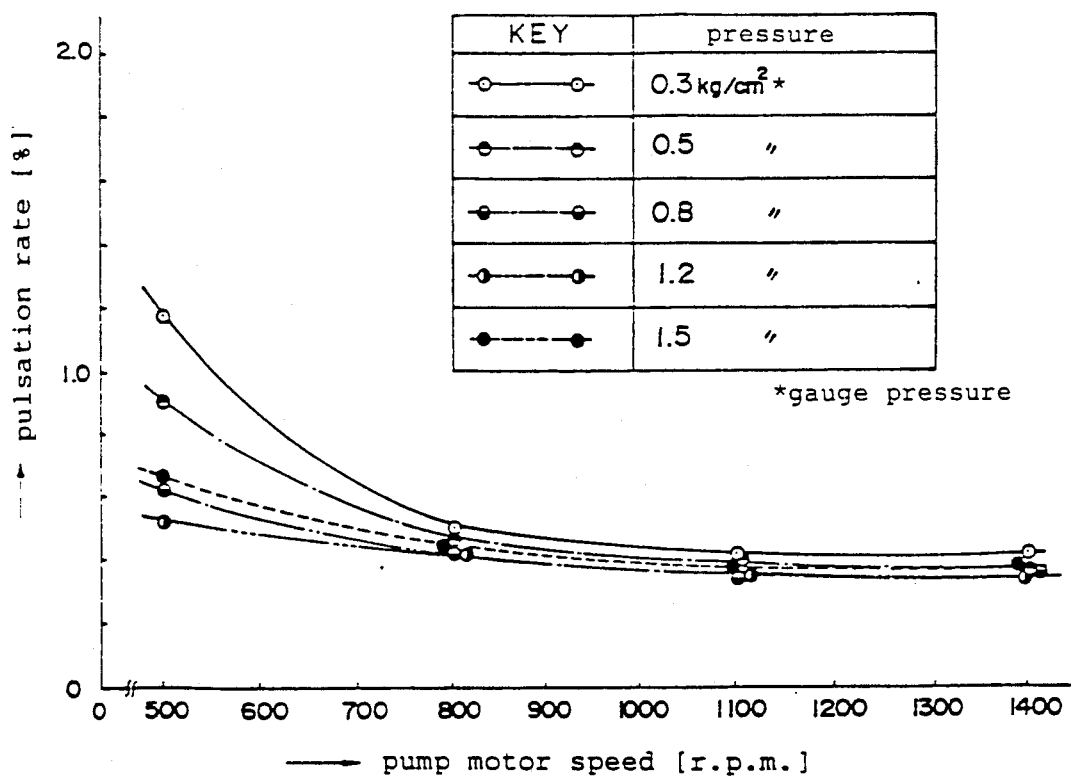
FIG. 3 is a graph showing test results in the test example.

Under the above conditions, the discharge volume of the photosensitive coating liquid and the pressure to be applied to the apparatus for preventing pulsations were changed by changing the number of rotations of the driving motor of the pump and by adjusting the valve F, respectively, and the pulsations produced in this manner were measured by the flow meter G. The results are shown in FIG. 3.

As a term used herein for expressing the extent or degree of pulsations, the form "pulsation rate" is defined in the pump as the ratio of the average discharge volume Q at a preset motor r.p.m. to the change caused in the discharge volume at any given instance, expressed in the term of percentage (%). Thus the pulsation rate is defined by $$\text{Pulsation rate} = \frac{\Delta Q}{Q} \cdot 100 \, (\%)$$

COMPARATIVE EXAMPLE 1

Figure 4:
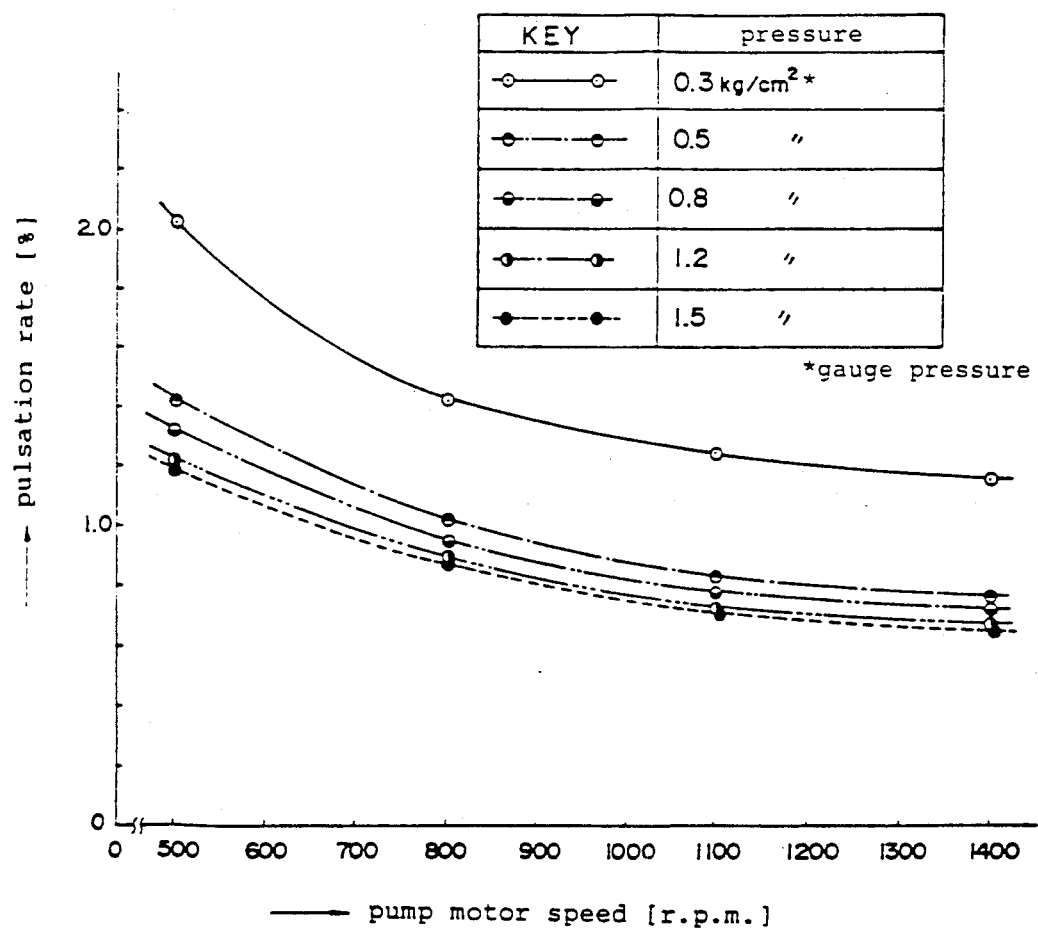
FIGS. 4 and 5 are graphs showing test results in the comparative examples 1 and 2, respectively.

The pulsations were measured under the conditions same as those of the Test Example 1, with the exception that the elastic body in the apparatus for preventing pulsations in Test Example 1 was dismounted. The results are shown in FIG. 4.

COMPARATIVE EXAMPLE 2

Figure 5:
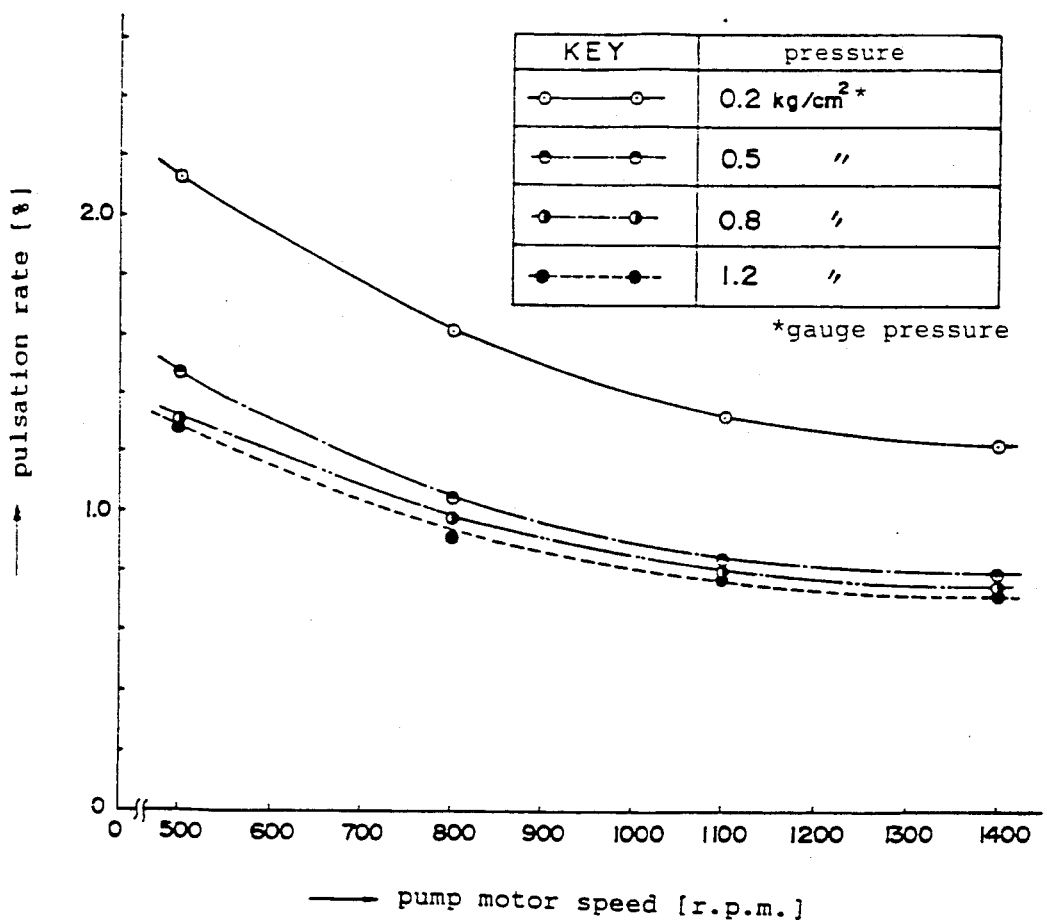

The pulsations were measured under the conditions same as those of the Test Example 1, except that a stainless steel pipe was used in place of the pulsation preventing apparatus in the test system in the Test Example 1. The results are shown in FIG. 5.

It may be seen from the results of the Comparative Examples 1 and 2 that the effect attributable to the composite hose per se in preventing pulsations is rather poor possibly because the wall thickness of the inner polyfluoroethylene lining of the composite hose is 1.5 mm so that the hose does not exhibit flexibility in the radial direction.

On the other hand, it is seen from the results of the Test Example and Comparative Example 1 that the method and the apparatus for preventing the fluid pulsations according to the present invention are highly effective in preventing the pulsations, and that, when employing the elastic body and the resilient (flexible) tube according to the Test Example 2, the optimum pressure to be applied to the liquid is 0.8 to 1.2 kg/cm² (gauge pressure). It may also be seen that under the tested conditions the effect in preventing pulsations is slightly lowered when the pressure applied to the liquid in the composite hose is increased excessively. Although the method and the apparatus according to the present invention may have significant effect for the fluid and inter alia on the liquid, it is to be noted that the present invention is also effective for liquids or gases containing solids or gases. In addition, although the PVC plate is employed as the elastic body in the Test Example, it may naturally be presumed that some different results may be achieved under conditions employing other members acting as the elastic body or a hollow substantially spherical body or a tube having flexibility at least in one cross-section thereof, and that there may exist optimum conditions that will give the optimum results.

What is claimed is:

1. An apparatus for preventing pulsations in a flowing fluid, comprising:
   a tube having at least a portion thereof which is flexible, said flexible portion having a flexible wall with a first flexural ability in a circumferential direction of the wall as viewed in a transverse cross section of the tube, and a second flexural ability in a radial direction of the wall, said second flexural ability being substantially greater than the first flexural ability, said tube transporting the flowing fluid so that a cross-sectional area of the flexible portion changes in response to a change in a pressure of the flowing fluid, and so that a circumferential length of said tube wall does not change in response to the change in the pressure of the flowing fluid; and
   a pair of flexible sheets, disposed so as to sandwich the at least flexible portion, for applying respective reaction forces so as to restore the cross-sectional area of the flexible portion to that cross-sectional area which existed before the change in pressure of the flowing fluid.

2. An apparatus as set forth in claim 1, wherein said flexible sheets are formed from PVC.

3. An apparatus as set forth in claim 1, wherein said pair of flexible sheets are fixedly secured to each other along both side ends thereof, and disposed so as to sandwich the at least flexible portion, said sheets constituting a sole means for applying respective reaction forces.

4. The apparatus as defined in claim 1, wherein the flowing fluid is pressurized, and wherein the cross-sectional area of the at least flexible tube portion increases in response to an increase in pressure of the pressurized flowing fluid.

5. An apparatus as set forth in claim 1, wherein said flexible wall has been preformed to a shape having a reduced cross-sectional area when the pressure of the fluid is not applied.

6. An apparatus as set forth in claim 5, wherein said preformed flexible wall has an elliptic shape in its cross-section.

7. An apparatus as set forth in claim 1, wherein said flexible wall extends along the flow of the fluid.

8. An apparatus as set forth in claim 7, wherein said flexible wall forms a tube portion connected in a pipe system.

9. An apparatus as set forth in claim 1, wherein said pair of sheets are secured to each other along both side ends thereof.

10. An apparatus as set forth in claim 1, wherein said sheets are sheet springs.

11. An apparatus as set forth in claim 1, wherein said flexible wall is formed of polyfluoroethylene.

12. An apparatus as set forth in claim 1, wherein said flexible wall is formed of polyethylene.

13. An apparatus as set forth in claim 1, wherein said flexible wall is formed of a composite sheet material comprising an inside layer of polyfluoroethylene and an outside layer of EPT rubber.

14. An apparatus for preventing pulsations in a flowing fluid, comprising:

a tube having at least a portion thereof which is flexible, said tube transporting the flowing fluid so that a cross-sectional area of the flexible portion changes in response to a change in a pressure of the flowing fluid; and a pair of flexible sheets, disposed so as to sandwich the at least flexible portion, for applying respective reaction forces so as to restore the cross-sectional area of the flexible portion to that cross-sectional area which existed before the change in pressure of the flowing fluid;

wherein said pair of sheets are secured to each other along both sides thereof, and wherein said sheets are secured to each other with spacers interposed between the sheets.

* * * * *